(12) United States Patent
Scott (10) Patent No.: US 8,954,511 B2
(45) Date of Patent: Feb. 10, 2015

(54) SYSTEM AND METHOD FOR COLLECTING AND PRESENTING RECORDS IN A JOURNAL ON AN ELECTRONIC DEVICE

(75) Inventor: Sherryl Lee Lorraine Scott, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 1467 days.

(21) Appl. No.: 11/263,020

(22) Filed: Nov. 1, 2005

(65) Prior Publication Data

US 2007/0099657 A1    May 3, 2007

(51) Int. Cl.
*G06F 15/16* (2006.01)
*H04M 1/725* (2006.01)
*H04M 1/2745* (2006.01)

(52) U.S. Cl.
CPC ...... *H04M 1/72552* (2013.01); *H04M 1/72566* (2013.01); *H04M 1/2745* (2013.01); *H04M 2250/10* (2013.01); *H04M 2250/60* (2013.01)
USPC ......................................................... 709/206

(58) Field of Classification Search
CPC ........................ H04M 1/72552; H04M 1/2745
USPC ......................................................... 709/206
See application file for complete search history.

(56) References Cited

U.S. PATENT DOCUMENTS

| | | | | |
|---|---|---|---|---|
| 6,333,973 B1 * | 12/2001 | Smith et al. | ............... | 379/88.12 |
| 7,334,726 B2 * | 2/2008 | Dulgerian et al. | ............ | 235/382 |
| 7,849,103 B2 * | 12/2010 | Hyatt et al. | ................... | 707/792 |
| 7,941,798 B2 * | 5/2011 | Taylor et al. | .................. | 717/170 |
| 2002/0128036 A1 * | 9/2002 | Yach et al. | .................... | 455/552 |
| 2002/0169769 A1 | 11/2002 | Jackson | | |
| 2002/0198890 A1 | 12/2002 | Jackson | | |
| 2003/0014395 A1 | 1/2003 | Ruvolo et al. | | |
| 2004/0139396 A1 | 7/2004 | Gelernter et al. | | |
| 2004/0267887 A1 * | 12/2004 | Berger et al. | ................. | 709/206 |
| 2005/0172033 A1 * | 8/2005 | Mathew et al. | ............... | 709/246 |
| 2006/0248598 A1 * | 11/2006 | Johnson et al. | .................. | 726/27 |
| 2007/0043687 A1 * | 2/2007 | Bodart et al. | ..................... | 707/1 |

FOREIGN PATENT DOCUMENTS

EP    1489501 A1    12/2004

OTHER PUBLICATIONS

Takkinen J. et al CAFE: A Conceptual Model for Managing Information in Electronic Mail:; Proceedings of the Annual Hawaii International Conference of System Sciences, XX, XX, 1998, p. 44-53, XP000775829.

* cited by examiner

*Primary Examiner* — Luat Phung
*Assistant Examiner* — Saad A Waqas
(74) *Attorney, Agent, or Firm* — McCarthy Tétrault LLP (57) ABSTRACT

A device and a method of organizing journaling items from applications processed by an electronic device are provided. The method comprises: defining a journal having a parameter for storing journaling items; defining contexts for the parameter by creating a context for each record using data from an application operating on the device which matches a relevant aspect of the parameter; upon detection of a new journaling item processed by the device, determining whether the new journaling item matches any of the contexts, and if so, updating the journal with details associated with the journaling item; and determining whether any previously processed journaling items processed by the device matches any of the contexts, and if so, updating the journal with details associated with the any previously received item. The device incorporates modules to perform the method.

18 Claims, 9 Drawing Sheets

| Type | From / To | Subject / Contents | Time |
|---|---|---|---|
| Emails | | | |
| Sent Email | TO: JohnDoe@company.com<br>CC: DavidSmith@company.com<br>FROM: me@company.com | Project Alpha | Jan. 31, 2005<br>12:01 pm |
| Calls | | | |
| Placed Call | 416.555.1212 | | Jan. 30, 2005<br>12:01 pm |
| Received Voice Mail | 416.555.1212 | | Jan. 30, 2005<br>9:00 pm |
| SMS | | | |
| Received SMS | 416.555.1212 | Status? | Jan. 30, 2005<br>10:00 pm |

| Type | From / To | Subject | Time |
|---|---|---|---|
| Sent Email | TO: JohnDoe@company.com<br>CC: DavidSmith@company.com<br>FROM: me@company.com | Project Alpha | Jan. 31, 2005<br>12:01 pm |
| Placed Call | TO:416.555.1212 | | Jan. 30, 2005<br>12:01 pm |
| Received SMS | 416.555.1212 | Status? | Jan. 30, 2005<br>10:00 pm |
| Received Voice Mail | 416.555.1212 | | Jan. 30, 2005<br>9:00 pm |

| Type | From / To | Subject / Contents | Time |
|---|---|---|---|
| Emails | | | |
| Sent Email | TO: JohnDoe@company.com<br>CC: DavidSmith@company.com<br>FROM: me@company.com | Project Alpha | Jan. 31, 2005<br>12:01 pm |
| Calls | | | |
| Placed Call | 416.555.1212 | | Jan. 30, 2005<br>12:01 pm |
| Received Voice Mail | 416.555.1212 | | Jan. 30, 2005<br>9:00 pm |
| SMS | | | |
| Received SMS | 416.555.1212 | Status? | Jan. 30, 2005<br>10:00 pm |

| Type | From / To | Subject / Contents | Time |
|---|---|---|---|
| From David Smith | | | |
| Received SMS | 416.555.1212 | Status? | Jan. 30, 2005 10:00 pm |
| Received Voice Mail | 416.555.1212 | | Jan. 30, 2005 9:00 pm |
| From you | | | |
| Placed Call | 416.555.1212 | | Jan. 30, 2005 12:01 pm |
| Sent Email | TO: JohnDoe@company.com<br>CC: DavidSmith@company.com<br>FROM: me@company.com | Project Alpha | Jan. 31, 2005 12:01 pm |

SYSTEM AND METHOD FOR COLLECTING AND PRESENTING RECORDS IN A JOURNAL ON AN ELECTRONIC DEVICE

FIELD OF THE INVENTION

The invention described herein relates to a system and method for organizing disparately sourced items, such as records of appointments, notes and different types of communications on an electronic device. In particular, the invention described herein relates to providing a series of journals which can be individually populated with such records by defining appropriate filters for the journals.

BACKGROUND OF THE INVENTION

The world has grown accustomed to mobile telephonic devices (MTD) such as cell phones and phone-based Personal Digital Assistants (PDAs). These devices function in a wireless network where one or more such devices communicate using voice or data to each other or to external services. Services can include making external phone calls to land-line voice networks, making phone calls to other cell phones, leaving or retrieving voice mail messages or exchanging data messages, such as e-mails, text messages, pages and others. Such devices send and receive a variety of communications in a variety of formats. Such devices can also track appointments and store electronic notes. All of the communications, appointments and notes are logged within the device.

As these devices become more ubiquitous, a vast number of communications, appointments and notes may become tracked by the devices. For example, a handheld device may be a mobile repository for a vast number of items, including email messages, short message service (SMS) messages, instant messaging (IM) messages, voice mail messages, other communications, appointments and notes. It is difficult to manage logs of these items when the total number of items is large. Prior art graphical user interfaces (GUIs) on devices provide limited customization of folders, by displaying only logs of items in a chronological list. Items are organized and presented by their respective types of communication technologies or related applications. Different groupings, such as grouping of items by topic or participant, regardless of the type of the item, are not provided. This is problematic when items from different types of communications related to the same topic are captured by the device. While the items are related by the topic, it can be difficult to find them and get an overall view of the status of the discussions on the topic at a given time.

There is a need to address deficiencies in the prior art.

BRIEF DESCRIPTION OF THE DRAWINGS

The invention will now be described, by way of example only, with reference to the accompanying drawings, in which.

DETAILED DESCRIPTION OF AN EMBODIMENT

The description which follows and the embodiments described therein are provided by way of illustration of examples of particular embodiments of the principles of the present invention. These examples are provided for the purposes of explanation and not limitation of those principles and of the invention. In the description which follows, like parts are marked throughout the specification and the drawings with the same respective reference numerals.

In a first aspect of an embodiment, a method of organizing journaling items from applications processed by an electronic device is provided. The method comprises: defining a journal having a parameter for storing journaling items; identifying any contexts for the parameter for different types of journaling items; upon detection of a new journaling item processed by the device, determining whether a context of the new journaling item matches any one of the contexts, and if so, updating the journal with details associated with the journaling item; and determining whether a context of any previously processed journaling items processed by the device matches any of the contexts, and if so, updating the journal with details associated with the any previously received item.

In the method, if the parameter defines a person, contexts for the parameter may be identified using a database used by an address book application accessed by the device to identify an address, a telephone number and email address associated with that person.

In the method, if the parameter defines an organization, contexts for the parameter may be identified using the database accessed by the address book to identify addresses, telephone numbers and email addresses associated with that organization.

In the method, if the parameter defines a topic, contexts may include text in a subject matter line in an email message relating to the topic, text in a subject matter line in an appointment relating to the topic and text in a message in a text message processed by the device.

In the method, the contexts may be identified by accessing a database associated with an address book application utilized by the device. Alternatively, the contexts may be identified by accessing a database associated with a calendar application utilized by the device. Alternatively still the contexts may be identified using other databases accessed by the device.

In the method, contents of the journal may be presented in a chronological order.

In the method, contents of the journal may be further grouped by types of applications.

In the method, the electronic device may be a portable device.

In the method, the applications may include at least two types of communication technologies.

In the method, the parameter may include a sub-parameter.

In the method, when the parameter is modified, new contexts for said parameter may be identified from the database of the address book and the journal may be updated to retain journaling items currently matching the parameter, as modified.

In a second aspect, an electronic device for processing items from applications is provided. The device comprises: a microprocessor; a display; and modules operating on the microprocessor. The modules include: an email module for generating, receiving and storing email messages; a telephone module for initiating and receiving telephone calls and for storing records relating to the telephone calls; an appointment module for creating, storing and tracking appointments; and an address book containing records of contact information relating to other modules. The device also has a journal module for organizing records of items processed by the other modules. The journal module: defines a journal having a parameter for its contents; identifies any contexts for the parameter relating to items processed by the modules of the device; detects processing of a new journaling item by a module, determines whether a context of the new journaling item matches any one of the contexts, and if so, updates the journal with details associated with the journaling item; and determines whether a context of any previously processed journaling items processed by the device matches any one of the contexts, and if so, updates the journal with details associated with any previously received item.

In the device, if the parameter defines an organization, contexts for the parameter are identified using the database accessed by the address book to identify addresses, telephone numbers and email addresses relating to the organization.

In the device, if the parameter defines a topic, the contexts may include text in a subject matter line in an email message relating to the topic, text in a subject matter line in an appointment relating to the topic processed and text in a message in a text message processed by the device.

In the device, contents of the journal may be presented in a chronological order.

In the device, contents of the journal may be further grouped by types of applications.

In the device, the contexts may be identified by accessing a database associated with an address book application utilized by the device.

In other aspects various combinations of sets and subsets of the above aspects are provided.

Figure 1:
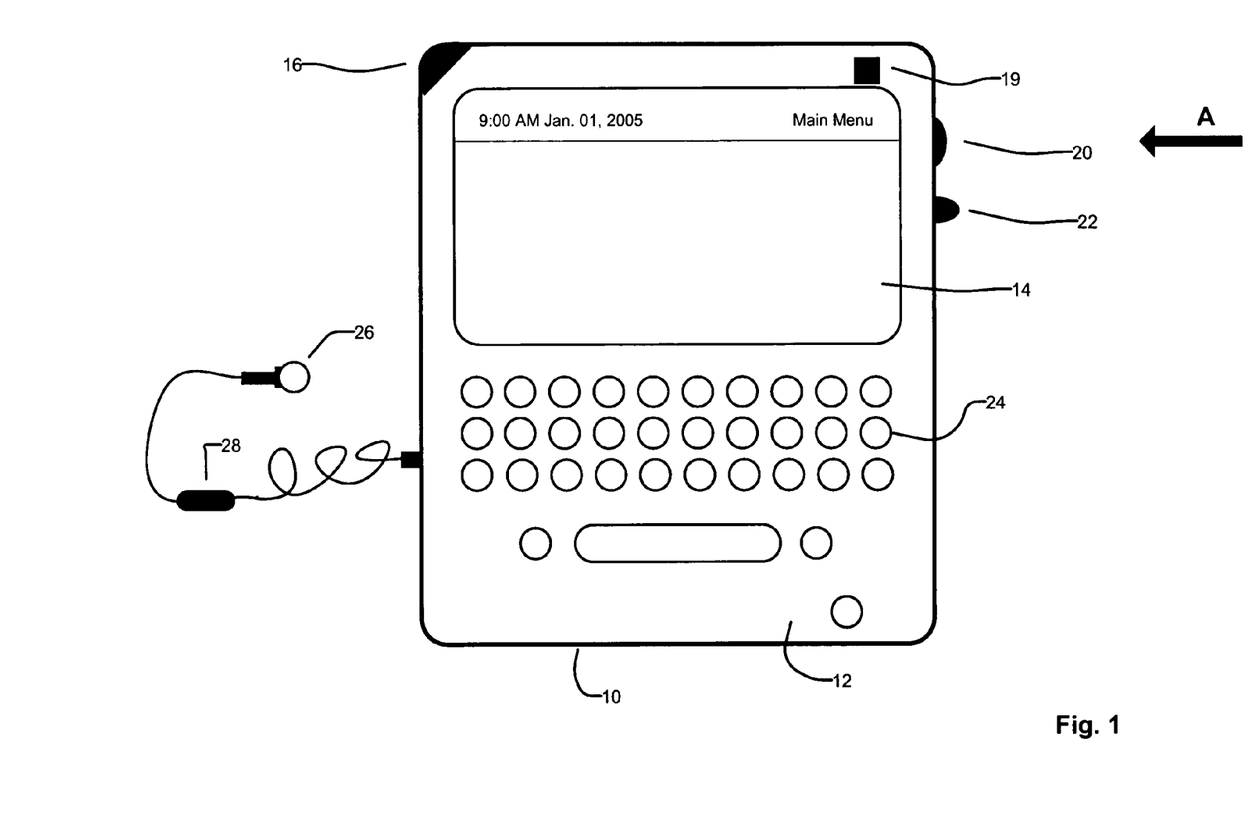
FIG. 1 is a schematic representation of an electronic device having a journal manager in accordance with an embodiment.

Referring to FIG. 1, an electronic device for receiving electronic communications, in accordance with an embodiment of the invention is indicated generally at 10. In the present embodiment, electronic device 10 is based on a computing platform having functionality of an enhanced personal digital assistant with cellphone and e-mail features. It is, however, to be understood that electronic device 10 can be based on construction design and functionality of other electronic devices, such as smart telephones, desktop computers pagers or laptops having telephony equipment. In a present embodiment, electronic device 10 includes: a housing 12, which frames an LCD 14, a speaker 16, an LED indicator 19, a trackwheel 20, an ESC ("escape") key 22, keypad 24, and a telephone headset comprised of an ear bud 26 and a microphone 28. Trackwheel 20 and ESC key 22 can be inwardly depressed along the path of arrow "A" as a means to provide additional user-input. It will be understood that housing 12, can be made from any suitable material as will occur to those of skill in the art. Device 10 is operable to conduct wireless telephone calls, using any known wireless phone system such as a Global System for Mobile Communications ("GSM") system, Code Division Multiple Access ("CDMA") system, Cellular Digital Packet Data ("CDPD") system and Time Division Multiple Access ("TDMA") system. Other wireless phone systems can include Bluetooth and the many forms of 802.11 wireless broadband, like 802.11a, 802.11b, 802.11g, etc. that can support voice. Other embodiments include Voice over IP (VoIP) type streaming data communications that can simulate circuit switched phone calls. Ear bud 26 can be used to listen to phone calls and other sound messages and microphone 28 can be used to speak into and input sound messages to device 10.

Figure 2:
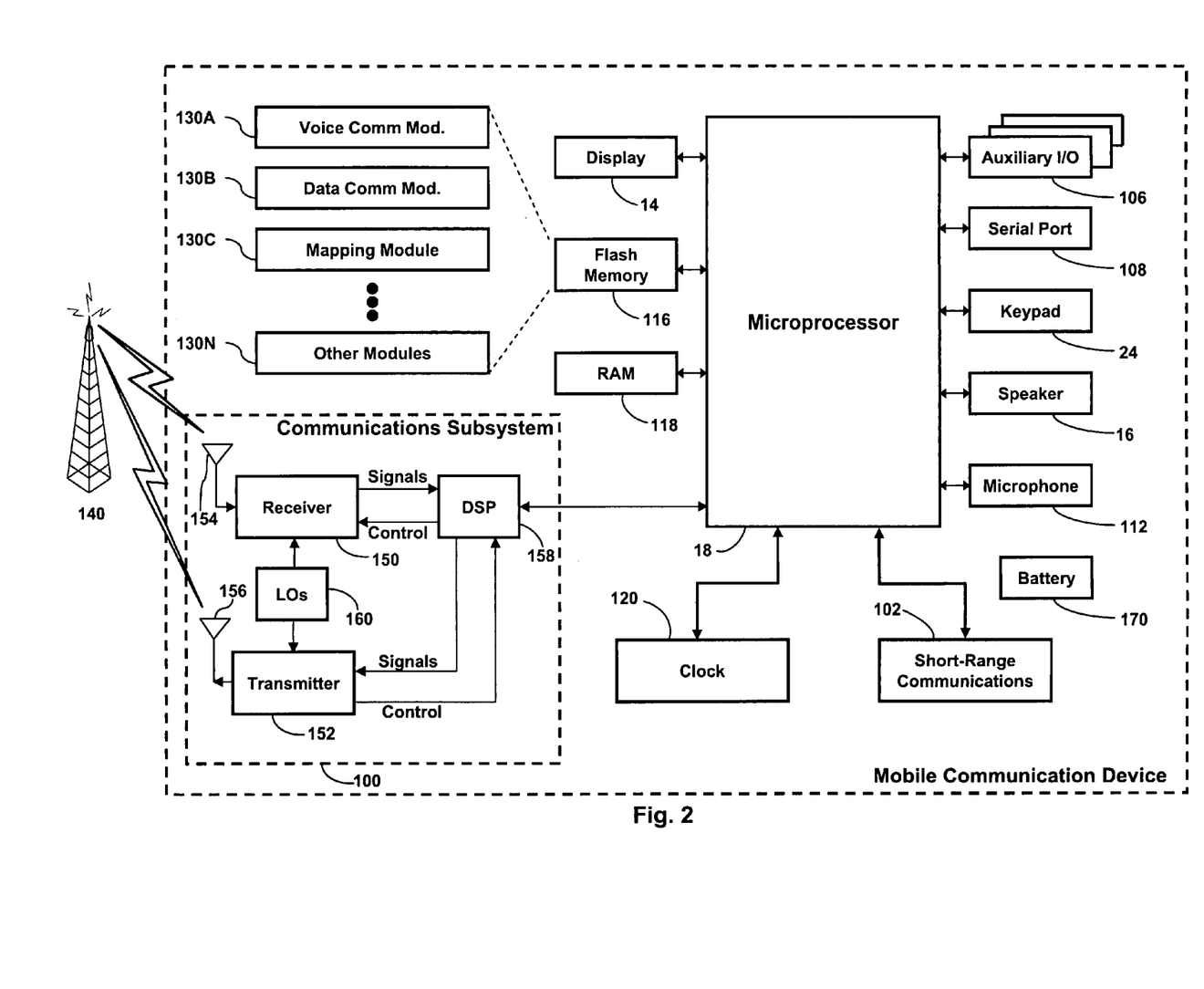
FIG. 2 is a block diagram of certain internal components within the device of FIG. 1.

Referring to FIG. 2, functional elements of device 10 are provided. The functional elements are generally electronic or electromechanical devices. In particular, microprocessor 18 is provided to control and receive almost all data, transmissions, inputs and outputs related to device 10. Microprocessor 18 is shown coupled to keypad 24, display 14 and other internal devices. Microprocessor 18 controls the operation of the display 14, as well as the overall operation of the device 10, in response to actuation of keys on the keypad 24 by a user. Exemplary microprocessors for microprocessor 18 include Data 950 (trade-mark) series microprocessors and the 6200 series microprocessors, all available from Intel Corporation.

In addition to the microprocessor 18, other internal devices of the device 10 are shown in FIG. 2. These include: a communication subsystem 100, a short-range communication subsystem 102, keypad 24, display 14, other input/output devices including a set of auxiliary I/O devices 106, a serial port 108, a speaker 16, a microphone port 112 for microphone 28, memory devices including a flash memory 116 (which provides persistent storage of data) and random access memory (RAM) 118, clock 120 and other device subsystems (not shown). The device 10 is preferably a two-way radio frequency (RF) communication device having voice and data communication capabilities. In addition, device 10 preferably has the capability to communicate with other computer systems via the Internet.

Operating system software executed by the microprocessor 18 is preferably stored in a computer readable medium, such as flash memory 116, but may be stored in other types of memory devices, such as read only memory (ROM) or similar storage element. In addition, system software, specific device applications, or parts thereof, may be temporarily loaded into a volatile store, such as RAM 118. Communication signals received by the mobile device may also be stored to RAM 118.

Microprocessor 18, in addition to its operating system functions, enables execution of software applications on device 10. A set of software applications 130 that control basic device operations, such as a voice communication module 130A and a data communication module 130B, may be installed on the device 10 during manufacture or downloaded thereafter. Cell mapping module 130C may also be installed on device 10 during manufacture. As well, additional software modules, illustrated as an other software module 130N, which may be, for instance, a personal information manager (PIM) application, may be installed during manufacture or downloaded thereafter into device 10. PIM application is preferably capable of organizing and managing data items, such as e-mail messages, calendar events, voice mail messages, appointments, and task items. Data associated with each application can be stored in flash memory 116.

Communication functions, including data and voice communications, are performed through the communication subsystem 100 and the short-range communication subsystem 102. Collectively, subsystem 102 and subsystem 100 provide the signal-level interface for all communication technologies processed by device 10. Various applications 130 provide the operational controls to further process and log the communications. Communication subsystem 100 includes receiver 150, transmitter 152 and one or more antennas, illustrated as receive antenna 154 and transmit antenna 156. In addition, communication subsystem 100 also includes processing module, such as digital signal processor (DSP) 158 and local oscillators (LOs) 160. The specific design and implementation of communication subsystem 100 is dependent upon the communication network in which device 10 is intended to operate. For example, communication subsystem 100 of the device 10 may be designed to operate with the Mobitex (trade-mark), DataTAC (trade-mark) or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communication Service (PCS), Global System for Mobile Communication (GSM), etc. Other types of data and voice (telephonic) networks, both separate and integrated, may also be utilized with device 10. In any event, communication subsystem 100 provides device 10 with the capability of communicating with other devices using various communication technologies, including IM systems, text messaging (TM) systems and SMS systems, which are specific types of text message systems.

In addition to processing communication signals, DSP 158 provides control of receiver 150 and transmitter 152. For example, gains applied to communication signals in receiver 150 and transmitter 152 may be adaptively controlled through automatic gain control algorithms implemented in DSP 158.

In a data communication mode, a received signal, such as a text message or web page download, is processed by the communication subsystem 100 and is provided as an input to microprocessor 18. The received signal is then further processed by microprocessor 18 which can then generate an output to the display 14 or to an auxiliary I/O device 106. A device user may also compose data items, such as e-mail messages, using keypad 24, a thumbwheel associated with keypad 24, and/or some other auxiliary I/O device 106, such as a touchpad, a rocker switch, a separate thumbwheel or some other input device. The composed data items may then be transmitted over communication network 140 via communication subsystem 100. Subsystem 100 may also detect when it is out of communication range for its remote systems.

In a voice communication mode, overall operation of device 10 is substantially similar to the data communication mode, except that received signals are output to speaker 16, and signals for transmission are generated by microphone 28. Alternative voice or audio I/O subsystems, such as a voice message recording subsystem, may also be implemented on device 10. In addition, display 14 may also be utilized in voice communication mode, for example, to display the identity of a calling party, the duration of a voice call, or other voice call related information.

Short-range communication subsystem 102 enables communication between device 10 and other proximate systems or devices, which need not necessarily be similar devices. For example, the short-range communication subsystem may include an infrared device and associated circuits and components, or a Bluetooth (trade-mark) communication module to provide for communication with similarly-enabled systems and devices.

Powering the entire electronics of the mobile handheld communication device is power source 170. Preferably, the power source 170 includes one or more batteries. More preferably, the power source 170 is a single battery pack, especially a rechargeable battery pack. A power switch (not shown) provides an "on/off" switch for device 10. Upon activation of the power switch an application 130 is initiated to turn on device 10. Upon deactivation of the power switch, an application 130 is initiated to turn off device 10. Power to device 10 may also be controlled by other devices and by internal software applications, as described further below.

Figure 3:
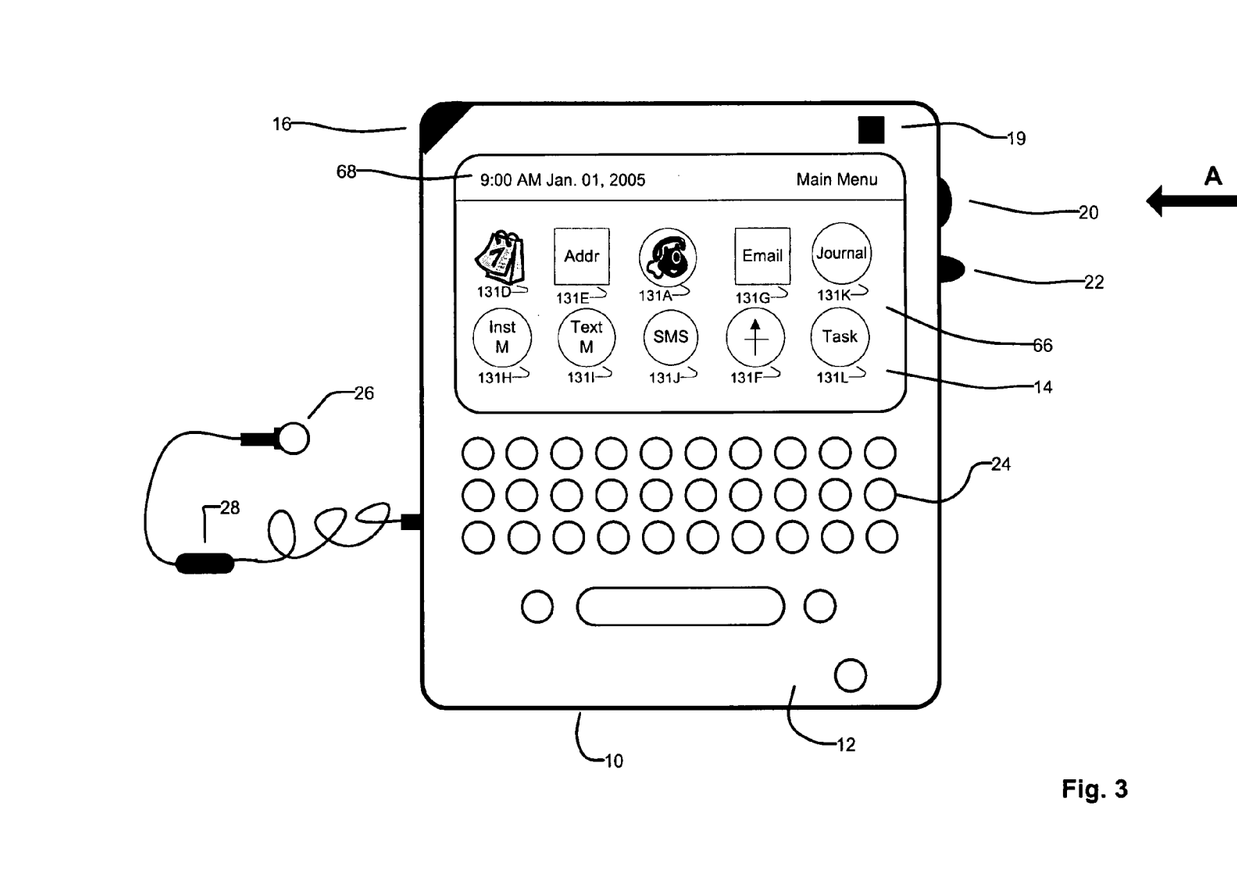
FIG. 3 is a schematic representation of the device of FIG. 1 with its display showing a plurality of icons for applications including an address book, a calendar, an instant message module, a short message service module, a task list manager and the journal manager.

Referring now to FIG. 3, device 10 is shown in operation where applications 130 stored therein are being executed. Applications generate and control aspects of main menu screen 66. Therein, system clock 68 is displayed providing time and date information which is updated according to internal clock 120. Main screen 66 has several applications presented thereon through separate icons 131, which individual represent separate applications 130. An icon is used to represent an application, file, folder or object stored or processed by the device. Using either specific keystrokes on keypad 24 or trackwheel 20, the icons can be sequentially highlighted and selected. In particular, to select and activate a particular application, once the icon is highlighted, it can be selected by clicking trackwheel 20 inwardly along the path of arrow A. ESC key 22 can be used to exit any application by pressing inwardly, along the path of arrow A, on ESC key 22. Generally, when no selected application is running in the "foreground" of device 10, (i.e. actively operating and generating its GUIs on the display after being explicitly activated by either the user or an internal command within device 10), then main menu screen 66 is generated on display 14. It will be appreciated that each application can provide a different type of communication, note, appointment or log processed by device 10. A brief description of functional aspects of selected applications is provided.

Calendar 130D (associated with icon 131D) tracks appointments and other status matters relating to the user and device 10. It provides a daily/weekly/month electronic schedule of appointments, meetings and events as entered by the user. Calendar 130D tracks time and day data for device 10 using processor 18 and internal clock 120. The schedule contains data relating to the current availability of the user. For example it can indicate when the user is busy, not busy, available or not available. The application can also provide a "do not disturb" window of time for a user. Effectively, calendar 130D allows device 10 to be set to not notify the user when an interrupt event occurs, in spite of any lack of scheduled appointments during that window. For example, if a telephone call is received in that window, the application can automatically route the call to voice mail without initiating the ring tone on device 10, and if an email is received, it is automatically stored, but no enunciation is generated. Once the time period for the window has passed, device 10 can then generate notifications (e.g. ring tones, buzz signals) on device 10 to alert the user of the previously received events. At that point, the user may then access the storage systems on device 10 to retrieve any stored particulars relating to the events.

In use, the user initiates calendar 130D which then generates input screens on device 10 that prompt the user to provide time, date and detail parameters for scheduled events. Typically the parameters are entered through keyboard 24. Alternatively, notification for scheduled events could be received via an encoded signal in a received communication, such as an e-mail, SMS message or voicemail message. Once the data relating to the event is entered, calendar 130D stores and processes information relating to the event; generates data relating to the event; and stores the data in memory in device 10, preferably non-volatile memory flash 116. This data can be accessed by calendar 130D and other applications.

Address book 130E (associated with icon 131E) enables device 10 to store contact information for persons and organizations. In particular, name, address, telephone numbers, e-mail addresses, cellphone numbers and other contact information are stored in linked records as identification tags. The contact data is stored in non-volatile memory, such as persistent storage 116 in device 10 in a database. In use, the database is organized such that individual contact information can be accessed and cross-referenced by other applications.

Telephone application 130A (associated with icon 131A) provides an interface to allow users to initiate and receive (wireless) telephone calls. It also provides a GUI to store and list a record of telephone calls made, telephone calls received and voice-mail messages stored by device 10. The database is accessible by other applications.

Email application 130G (associated with icon 131G) provides modules to allow users to generate, receive and track email messages. Messages are sent to and received from other parties identified by their email addresses. Application 130G also provides a GUI which provides a historical list of emails received, drafted, saved and sent.

Journal manager 130K (associated with icon 131K) is an application which allows user of device 10 to define different journals which each are used to store different collections of items processed by device 10, utilizing settings and priority information provided by the user to journal manager 130K. Further detail on the operation of journal manager 130K is provided later.

IM application 130H (associated with icon 131H) provides modules to allow users to receive, generate, track and process instant messages. Messages are sent to and received from other parties identified by their telephone numbers. Application 130H also provides a GUI which provides a historical list of instant messages received, drafted, saved and sent.

TM application 130I (associated with icon 131I) provides modules to allow users to receive, generate, track and process text messages. Text messages are sent and received to and from recipients as identified by their telephone numbers. Application 130I also provides a GUI which provides a historical list of text messages received, drafted, saved and sent.

SMS application 130J (associated with icon 131J) provides modules to allow users to receive, generate, track and process SMS messages. Messages are sent and received to and from recipients as identified by their telephone numbers. Application 130J also provides a GUI which provides a historical list of SMS messages received, drafted, saved and sent.

Location module 130F (associated with icon 131F) provides the current geographic location of device 10. In one embodiment, it receives and interprets remote GPS signals from a system of satellites to triangulate the current location of device 10, using, for example GPS modules and applications known in the art. On device 10, a GPS interface application controls the storage of GPS data retrieved by location module 130F. Alternatively, location information may be determined by analyzing encoded data relating to cellular telephone calls executed on device 10. For example, the encoded data stream can be examined to identify the current base station to which device 10 is communicating.

In any event, once location module 130F has location information for the device, it provides graphical information in a map presented on display 14 showing the current location of device 10. As specific locations may have specific contexts for the user (e.g. home, office, cottage, parents' home, out of the city, etc.), GPS interface application allows associations to be made between specific locations or regions with appropriate text labels. The associations are stored in a database and can be accessed by all applications 130 as needed.

Task application 130L (associated with icon 131L) allows the user to track and enter memo notes with "to-do" items. It provides similar functionality to calendar 130D, but also allows for simple, text-only notes to be collected and tracked in a single application. In other embodiments, task application 130L may be incorporated into calendar application 130D and may generate timed reminders on the device 10 for the user.

The applications that process events, appointments, notes or communications (e.g. calendar 130D, telephone 130A, email application 130G, IM application 130H, TM application 130I, SMS application 130J and task manager 130L) can track their respective items through separate activity logs which can be displayed through separate GUIs controlled by each application. Each application stores its activity log in a non-volatile memory location, such as in memory 116. The embodiment also provides a basic log showing a chronological list of recently processed items (e.g. received emails and call records).

However, the embodiment can also sort and store items, regardless of their type (e.g. email, appointment, text message, or note), into a journal based on a parameter defined for the journal. The parameter identifies a particular characteristic that an item needs to have to be contained within the journal. In other embodiments, two or more parameters may be used; and the parameters may be ranked, as logically permitted.

It will be appreciated that a parameter can have different contexts for two or more different items, depending on the nature of the items. Some exemplary contexts for some exemplary parameters for journals are provided. First, if a parameter identifies a particular person for a journal, then email application 130G may identify the person by the full email address of a sender or recipient of an email; however, in SMS application 130J, the person could be identified by a telephone number associated with that person. Next, if a parameter identifies a particular organization, then email application 130G may identify the organization by the destination address in an email address of a sender or recipient; however, in SMS application 130J, the organization may be identified by a block of telephone numbers associated with that organization. Next, if a parameter identifies a particular topic, then email application 130G may identify that topic by the subject heading of an email; alternatively, in SMS application 130J, the topic could be identified by text in the message itself. Alternatively, a parameter may have just one context, for example a date value.

Contact data managed by address book 130E in the database accessed by address book 130E provides cross-reference data points which provide contexts for the parameters of a journal for the different types of items processed by the device. For example, if a journal is defined with a specific value for the "person" parameter, journal manager 130K accesses database used by address book 130E, analyzes its records and identification tags and builds a list of corresponding source addresses relating to contexts for that "person" for each type of item processed by device 10. Following with the example, if the "person" is "David Smith", then journal manager 130K accesses the database accessed by address book 130E to identify all related contact information for "David Smith". This can include his email address(es) (e.g. dsmith@company.com, davesmith@myhome.com), his telephone number(s) (e.g. 416-555-1212), his SMS address(es) and any other contact information relating to him for other communication technologies.

When an item is being considered for entry into a journal, its various contexts are extracted and compared with contexts identified for the journals. If there is a match between the context of the item and the contexts of a journal, then the item is stored in that journal.

Each item is treated as a journaling item and can be stored in multiple journals. The journals are preferably automatically updated when new items are processed or when the parameter for a journal is amended. When requested, the contents of the journal can be displayed on display 14, providing the user with an updated record of journaling items which match the journal's parameter.

The processing, filtering and storing of journaling items is handled by journal manager 130K, which is one type of PIM. Specifically, journal manager 130K provides processes which allow creation and management of journals. The parameters for a journal are defined by a set of parameter filters, whose values are set by the user. In particular, the parameters identify what conditions are necessary to include a journaling item into that journal. Exemplary parameters include the name of the sender/recipient of a communication or item, the time associated with an item, the location associated with an item, a title or subject matter ("re-line") associated with an item and the contents of an item. As such, records of different types of items, such as email messages sent, SMS messages received, notes and appointments booked having contexts involving a common parameter can be stored in one journal.

For example, the user may define a journal to include only items (e.g. tasks, notes, appointments and communications) relating to "David Smith". As noted earlier, this may include records of: (i) any telephone calls connected to a telephone number associated with him, using telephone number records in address book 130E or telephone 130A; (ii) any emails sent or received from an email address associated with him, using the email addresses stored in address book 130E or email application 130G; (iii) any email message having a subject line containing the text "David Smith"; (iv) any appointment tracked by calendar 130D containing an entry for "David Smith"; (v) any text message containing the text "David Smith"; and (vi) any note containing the text "David Smith". As such, once the different contexts for the parameter for the "David Smith" journal are defined, device 10 utilizes a monitor embodied in software to review its activity logs of all of its relevant applications and updates a log of any items having a context that relate to David Smith. The monitor can utilize database access techniques known in the art to review the logs and identify matches for a particular log. Templates for the filters for the journals and any identified contexts for the journals may be stored in flash memory 116.

Further details on the operation of journal manager 130K are provided via an exemplary checklist which allows the user to define a new journal through a GUI. In particular, checklist A allows the user to create and populate a journal with journaling items that satisfy defined parameters for the journal.

Checklist A: Journal Definition Screen

---

For this journal, please give it a name. Also, please select below, the parameter which defines the contents for this journal.

All journaling items (e.g. appointments, notes, communications sent or received) relating to person.  X
All journaling items relating to an organization.
All journaling items relating to a topic.
[other additional parameters can be provided]
...
All correspondence sent to or received from a during timeframe.

---continued

---

For this journal, please give it a name. Also, please select below, the parameter which defines the contents for this journal.

All correspondence sent to or received from a person during timeframe.
All journaling items relating to a calendar entry.

---

In the checklist, the "person", "organization", "topic", "timeframe" and "calendar entry" parameters (noted in bold and underline) are entered by the user by either the keyboard or through a selection menu which is generated by journal manager 130K and shown on display 14. Additional parameters may be provided. Other journals may be defined using various combinations of one or more parameters and each parameter may further have sub-parameters associated with it. For example, a journal may be defined to contain all correspondence sent from "David Smith" "yesterday" or only all telephone calls from "David Smith". A "calendar entry" may relate to a particular meeting date, meeting type, meeting location, list of attendees or other characteristics of the meeting. It will be appreciated that other items tracked by device 10 may provide suitable parameters which may be used to define a journal.

Once the parameter is defined, journal module 130K accesses data from additional sources, such as contact data used by address book 130E, the parameters relating to a calendar event or parameters relating to a calendar entry, to build a set of contexts for the value of the parameter. Contexts for "organization", "timeframe" and "subject matter" parameters can be built by accessing the database used by address book 130E or other sources and analyzing other records and identification tags to identify relevant contexts for those parameters. Contexts for a "calendar entry" parameters can be built by accessing the database used by calendar 130D and/or accessing the database used by address book 130E.

Similarly, if any parameter has any sub-parameters defined for it, each sub-parameter can have its sub-contexts determined by reviewing the data used by the address book or other sources.

Thereafter, when a new journaling item is processed (e.g. a new email is received or sent or a note is stored), a monitor in the embodiment checks whether the contexts of the contact information of the item matches the contexts defined for parameters of any journal. In the above example, if an email is received, then the monitor extracts the context of the sender information from the email and compares it against the known email address for "David Smith" stored in the contexts for the parameters for the "David Smith" journal. If there is a match, then a log of the email is provided to the "David Smith" journal. As such, when the user of device 10 opens that journal, all log entries relating to different types of appointments, notes or communications which involves "David Smith" are provided in it. For example, the log would include references to any emails sent to or received from "dsmith@company.com", any text message containing the text "David Smith" or any voicemail messages received from 416-555-1212. These items can also be logged by other journals, if they match the contexts of the parameters of other journals.

Similarly, when a journal is defined to store items received from or sent to an "organization", the monitor examines relevant entries in address book 130K for any addresses (e.g. email, SMS, telephone numbers, etc.) that match that "organization" and builds a corresponding set of contexts for the parameter of the journal. When a new journaling item is processed, its "organization" context is compared against the contexts for the "organization" journal parameter. Again, if there is a match, its log entry is added to the "organization" journal. Address book 130K may facilitate processing of this type of journal by allowing for the association of a group of separate entries under an umbrella "organization" name. Also, an "organization" may be defined by the journal as a set of individually identified sources (e.g. a set of specific email addresses and/or telephone numbers) for a particular context set. This set may be built up by sequentially adding sources to the organization set through an appropriate GUI on device 10.

When a journal is defined to store items relating to a "topic", the monitor can examine any previously or newly received journaling items to see whether their re lines or contents identify that "topic". Again, if there is a match, the log entry of the item is added to the "topic" journal.

When a journal is defined to store items received within a "timeframe", the monitor can examine any previously or newly received journaling items to see whether their associated timestamps fall within that "timeframe". Again, if there is a match, the log entry of the item is added to the "timeframe" journal.

When a journal is defined to store items related to a "calendar event", the monitor can examine any previously or newly received journaling items to see whether they have a context which matches the parameters defined by the "calendar event". Again, if there is a match, the log entry of the item is added to the "calendar event" journal.

Journal manager 130K provides a journal of previously received and new journaling items processed by device 10. Once a journal is defined and saved, journal manager 130K creates the monitor to process new journaling items. Also, the contexts of previously processed journaling items are examined to see whether any item matches the contexts of the parameters of the new journal.

Figure 4:
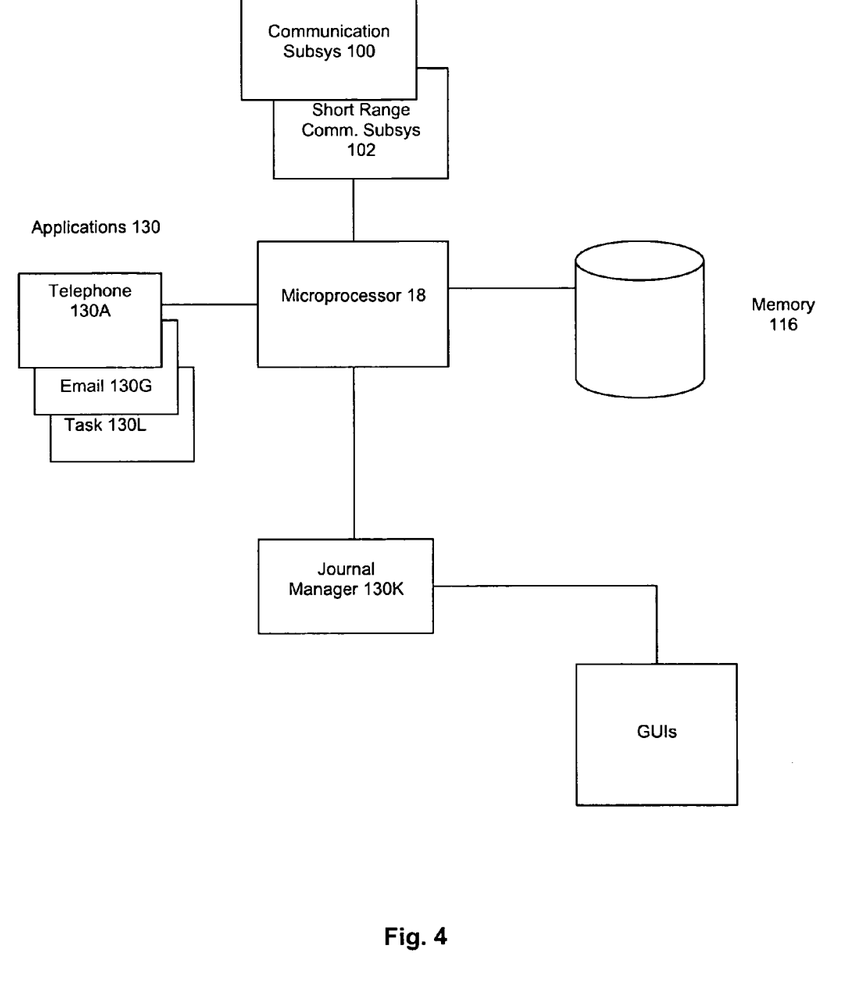
FIG. 4 is a block diagram showing relationships among received communications, appointments, notes, applications, databases and internal components of the embodiment of FIGS. 1 and 2.

Further detail is now provided on operating aspects of journal manager 130K. In particular, referring to FIGS. 4 and 5, aspects of relationships between components, applications 130, GUIs generated for main screen 66 and journal manager 130K are shown. FIG. 4 shows how data is processed amongst the noted components and FIG. 5 illustrates a general flow in processing the data to generate journals.

Figure 5:
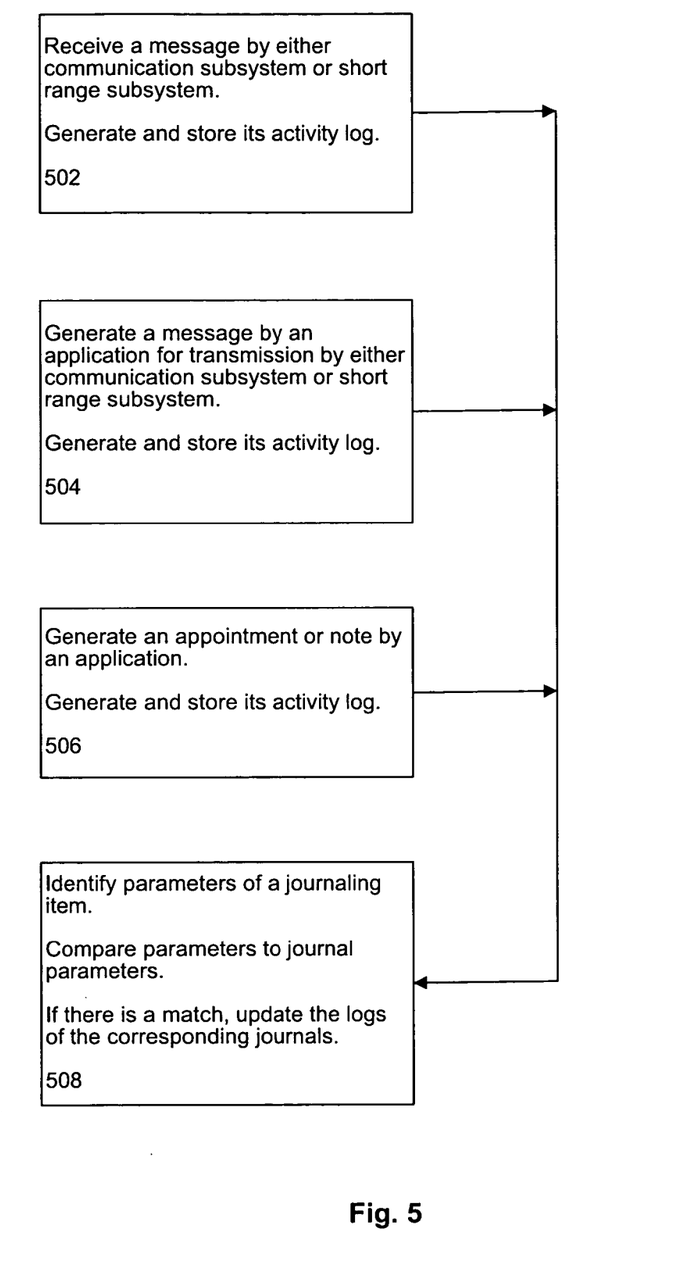
FIG. 5 is a flow chart of basic steps performed in processing and organizing communications, appointments and notes processed by the journal manager of FIG. 1.

FIG. 5 illustrates the processing of received messages (in any communication technology), a sent message (again in any communication technology) and appointments or notes. Each is discussed in turn.

First, when a message is received by either communication subsystem 100 or short range subsystem 102, it is initially processed by software operating on microprocessor 18. When the format of the received communication is determined, data relating to the communication is processed by the appropriate application 130. Activity log data for the communication is processed by the application and the related data is stored in memory 116. See step 502.

Similarly, when a message is generated to be sent by device 10, the corresponding application 130 is first activated (e.g. email application 130G or SMS message application 130J) and the message is created and sent. Then, the activity log data for the message is processed by the application and the related data is stored in memory 116. See step 504.

Similarly, when an appointment or note is generated by device 10, the corresponding application 130 is first activated (e.g. calendar application 130D or task application 130L) and the corresponding appointment or note is created and stored. Then, the activity log data for the appointment or note is processed by the application and the related data is stored in memory 116. See step 506.

Any item created or processed in steps 502, 504 and 506 is a journaling item, which is further processed by journal manager 130K. In particular, as or after the journaling item is processed by its application 130, the monitor process in journal manager 130K is notified of the new item. This may be accomplished either by having a separate signal sent to it from the originating application 130 or by detecting the journaling item through other signals or monitors operating on device 10. Known programming signalling processes and techniques can be used to by the monitor process to accomplish this task. Once the journaling item is detected, journal manager 130K analyzes fields of the item for its various contexts (e.g. "person", "organization", "topic", etc.) to determine whether the item matches any journal parameters. If any matches are found, then the matching journals are updated with the item's log information. As noted before, when a new journal is defined, the monitor also checks previously processed journaling items to see whether they should be included in that journal. The timing of this check may be done shortly after creation of the new journal or sometime thereafter. See step 508.

Existing set of journal parameters can be modified to add, delete or change parameters in the current set. To modify a set, the user may initiate a change command which then generates a screen similar to Checklist A. The current parameters for a journal are presented and modification can be made therein. Once the modifications are entered, the new parameters are processed in a similar manner to a new journal. After modifications are made, journal manager 130K may examine each existing item in the journal and determine whether it still meets the new journal parameters. Items which do not match are deleted. Journal manager 130K may then check all previously processed journaling items to see if any of them should be added to the journal. Alternatively, journal manager 130K may delete the contents of the existing journal and build a new journal, using processes already described.

Figure 6:
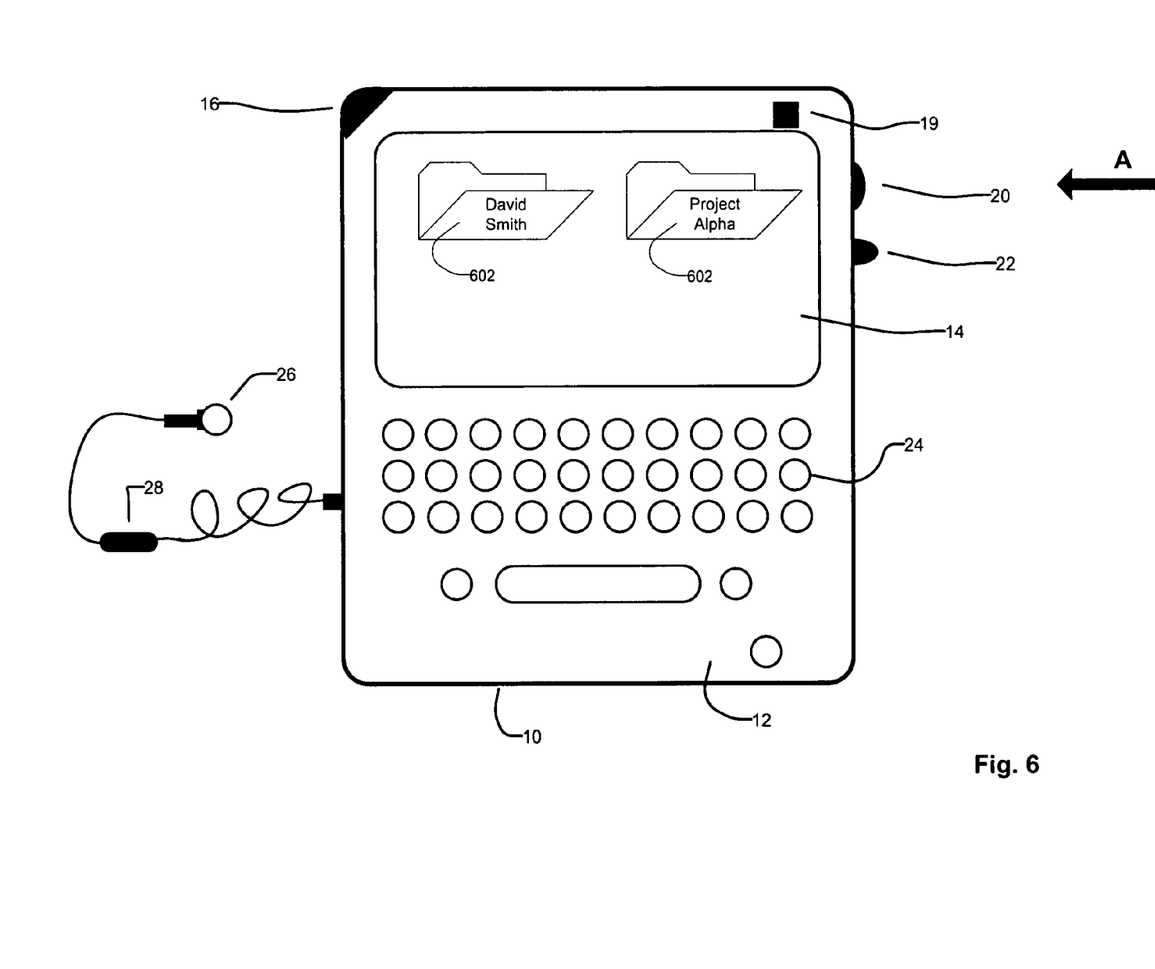
FIG. 6 is a schematic representation of the device of FIG. 1 showing a screen generated by the journal manager during its execution.

Referring to FIG. 6, to display the defined journals, journal manager 130K produces a GUI 600 where a set of journals 602 are displayed on display 14, with each journal representing a defined journal. The "name" associated with the journal may be presented by it, room permitting. If the user wishes to examine the contents of a particular journal, he would activate it by either selecting and activating the journal using thumbwheel 20. The contents of a journal can be displayed in different formats, including chronological order and an order by item type. Special text notes can also be created and associated with individual journals. A count figure can be tracked and provided for all types of items contained in the journal.

The embodiment provides several journal presentation formats. Selection and implementation of the formats is provided by journal manager 130K. In particular, once a journal 602 is activated, the log contents are shown. Exemplary viewing options for a journal are noted below.

Figure 7A:
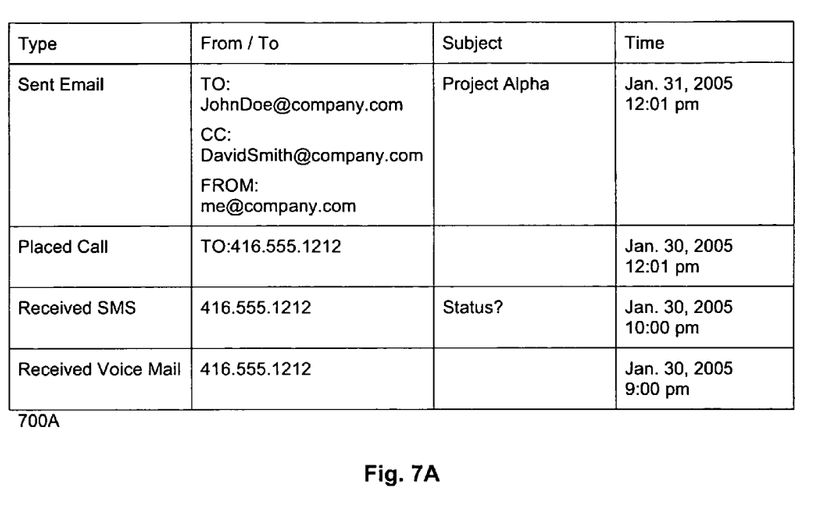
FIG. 7A is a schematic representation of an image generated on a display of the device of FIG. 1 showing contents of one journal in one format produced by the journal manager after execution of the flow chart of FIG. 5.
Figure 7B:
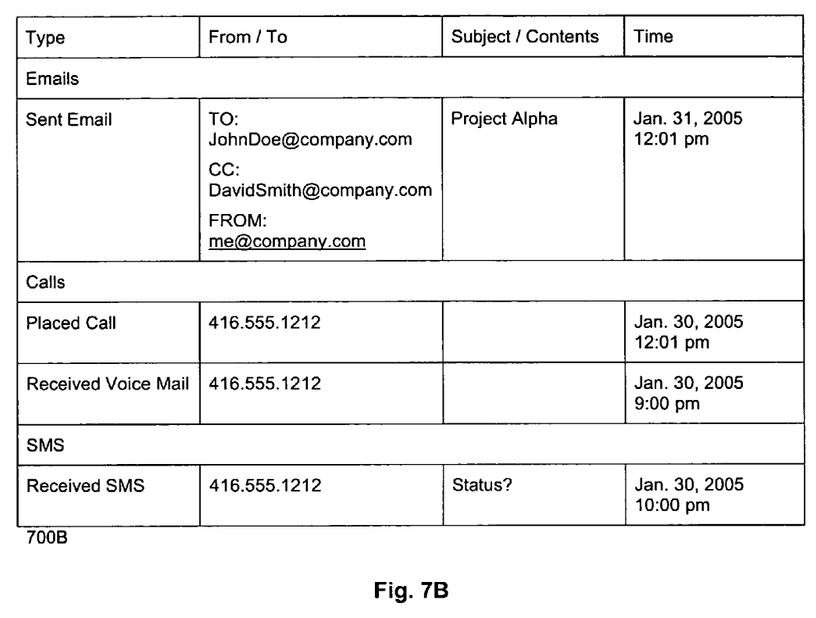
FIG. 7B is a schematic representation of an image generated on a display of the device of FIG. 1 showing contents of one journal in another format produced by the journal manager after execution of the flow chart of FIG. 5.
Figure 7C:
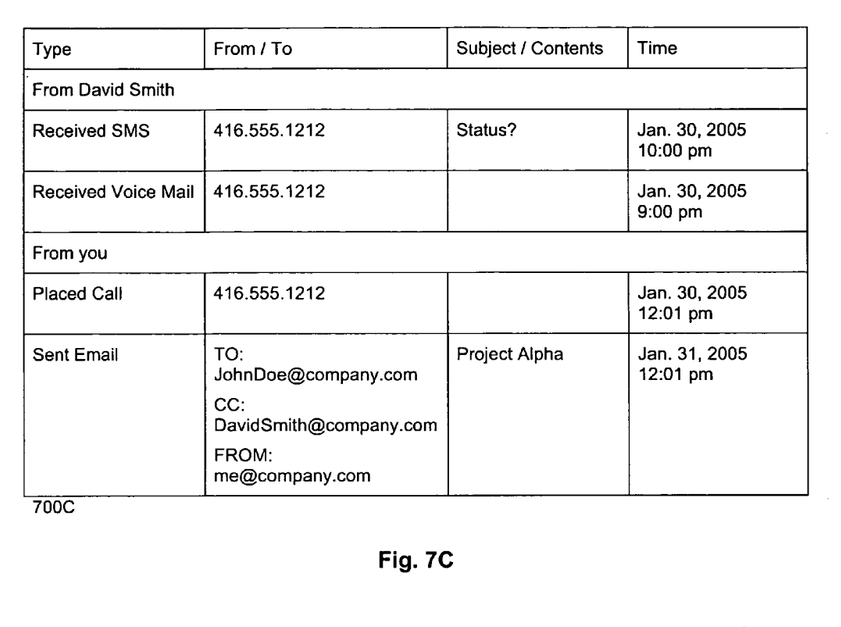
FIG. 7C is a schematic representation of an image generated on a display of the device of FIG. 1 showing contents of one journal in yet another format produced by the journal manager after execution of the flow chart of FIG. 5.

First, FIG. 7A shows one layout of results of a journal 602 shown in a GUI screen 700A having results shown in a table format in chronological order (newest first). Alternatively, the results may be shown in a calendar format. Next, FIG. 7B shows another layout shown in GUI screen 700B where results are shown in a table format by type-order (e.g. email, voice mail, etc.). Next, FIG. 7C shows another layout shown in GUI screen 700C having results shown in a table format in name order (e.g. by sender's name). It will be appreciated that other presentation formats may be provided.

It will be appreciated that the journal manager and other applications in the embodiments can be implemented using known programming techniques, languages and algorithms.

Data storage, access and update algorithms allow data to be shared between applications (e.g. between email application 130G, address book 130E and journal manager 130K). Signals can be generated, sent, received and responded to between modules using known programming techniques.

The present invention is defined by the claims appended hereto, with the foregoing description being merely illustrative of a preferred embodiment of the invention. Those of ordinary skill may envisage certain modifications to the foregoing embodiments which, although not explicitly discussed herein, do not depart from the scope of the invention, as defined by the appended claims.

I claim:

1. A method of organizing journals tracking communications processed by an electronic device, comprising:
storing records in a database accessible by the electronic device relating to emails, telephone calls and appointments records processed by the electronic device;
in the database, creating associations for an organization as a parameter for a first journal using data containing contact information used by an address book application operating on the electronic device to link the organization with each of a plurality of telephone numbers, a domain name for a, destination email address associated with the organization and a plurality of appointment contexts;
defining a second journal to track records relating to emails, telephone calls and appointments associated with a topic;
when a new email is received by the electronic device,
examining a domain name portion of a destination address of the new email to determine whether the domain name portion matches the domain name of the destination email address of the organization, and if so, updating the first journal to include details Lthe new email; and
determining whether contents of the new email match the topic, and if so,
updating the second journal with details associated with the new email;
when a new telephone call is received by the electronic device, determining whether a telephone number for the new telephone call matches one of the plurality of telephone numbers of the organization, and if so, updating the first journal to include details of the new telephone call;
when a new appointment request is received by the electronic device,
determining whether a context of the new appointment request matches one of the plurality of appointment contexts of the organization, and if so, updating the first journal to include details of the new appointment request; and
determining whether contents of the new appointment request match the topic, and if so, update the second journal to include details of the new appointment request;
when a new text message is received, determining whether contents of the new text message match the topic, and if so, updating the second journal to include details of the new text message;
when an email from the electronic device is sent, determining whether contents of the sent email match the topic, and if so, updating the second journal to include details of the sent email;
determining whether previously received emails, telephone calls and appointment requests processed by the electronic device match any one of the at least one destination email address, the plurality of telephone numbers or the plurality of appointment contexts of the organization, and if so, updating the first journal to include details of the matching previously received emails, telephone calls and appointment requests;
when modifications are made to the topic of the second journal to create a new topic, examining records in the second journal, determining whether the records meet the new topic and deleting any record of the records that do not match the new topic from the second journal; and
displaying on a display of the electronic device contents of the first journal.

2. The method of organizing journals as claimed in claim 1, further comprising displaying on the display contents of the first journal grouped by at least the email communications and the telephone calls when a second viewing option for the first journal has been selected.

3. The method of organizing journals as claimed in claim 2, wherein the electronic device is a portable device.

4. The method of organizing journals as claimed in claim 3, wherein the emails and the telephone calls operate on two types of communication technologies.

5. The method of organizing journals as claimed in claim 1, wherein additional contexts for the plurality of contexts are created using data in the database associated with calendar entries in a calendar application operating on the electronic device.

6. The method of organizing journals as claimed in claim 1, wherein the journal also contains text files associated with the organization.

7. An electronic device, comprising:
a display;
a database accessible by the electronic device containing records relating to emails, telephone calls and appointments; and
associations for an organization that link the organization to a plurality of telephone numbers, a domain name and a plurality of appointment contexts;
a microprocessor configured to:
create the associations as a parameter for a first journal for the organization tracking communications received by the electronic device using data containing contact information used by an address book application operating on the electronic device to link the organization with each of a plurality of telephone numbers, a domain name for a destination email address and a plurality of appointment contexts;
store records in a database accessible by the electronic device relating to emails, telephone calls and appointments records processed by the electronic device;
define a second journal to track records relating to emails, telephone calls and appointments associated with a topic;
when a new email is received by the electronic device,
examine a domain name portion of a destination address of the new email to determine whether the domain name portion matches the domain name of the destination email address of the organization, and if so, update the first journal to include details of the new email; and
determine whether contents of the new email match the topic. and if so. updating the second journal with details associated with the new email;
when a new telephone call is received by the electronic device, determine whether a telephone number for the new telephone call matches one of the plurality of telephone numbers of the organization, and if so, update the first journal to include details of the new telephone call;

when a new appointment request is received by the electronic device, determine whether a context of the new appointment request matches one of the plurality of appointment contexts of the organization, and if so, update the first journal to include details of the new appointment request; and determine whether contents of the new appointment request match the topic, and if so, update the second journal to include details of the new appointment request;

when an email from the electronic device is sent, determine whether contents of the sent email match the topic, and if so, updating the second journal to include details of the sent email;

when a new text message is received, determine whether contents of the new text message match the topics, and if so, update the second journal to include details of the new text message;

when modifications are made to the topic of the second journal to create a new topic. examine records in the second journal, determine whether the records meet the new topic and delete any record of the records that do not match the new topic from the second journal;

determine whether previously received emails, telephone calls and appointment requests processed by the electronic device match any one of the at least one destination email address, the plurality of telephone numbers or the plurality of appointment contexts of the organization, and if so, update the first journal to include details of the matching previously received emails, telephone calls and appointment requests; and group entries in the journal by sender when a first viewing option for the first journal has been selected.

8. The electronic device as claimed in claim 7, wherein the microprocessor is further configured to define the telephone context to include data in identification tags in the database used by an address book application operating on the electronic device relating to an address and a telephone number for the organization.

9. The electronic device as claimed in claim 7, wherein the microprocessor is further configured to group contents of the first journal by at least the emails and the telephone calls when a second viewing option has been selected.

10. The electronic device as claimed in claim 9, wherein the microprocessor is further configured to:

identify new contexts for the journal when the parameter for the first journal is changed and update the first journal to retain records matching the parameter.

11. The electronic device as claimed in claim 7, wherein the first journal also contains text files associated with the organization.

12. The electronic device as claimed in claim 7, further comprising:

a graphical user interface (GUI) application to present a GUI on a display of the electronic device providing an input interface to define aspects of the organization.

13. The electronic device as claimed in claim 7, wherein the microprocessor is further configured to present all entries in the first journal in one of a first group of emails received from a sender, a second group of sent emails and a third group of the telephone calls when a second viewing option has been selected.

14. A non-transitory computer-readable memory including computer processing instructions for a microprocessor, the computer-readable memory including instructions to:

store records in a database accessible by the electronic device relating to emails, telephone calls and appointments records processed by the electronic device;

in the database, create associations for an organization as a parameter for a first journal using data containing contact information used by an address book application operating on the electronic device to link the organization with each of a plurality of telephone numbers, a domain name for a destination email address associated with the organization and a plurality of appointment contexts;

define a second journal to track records relating to emails, telephone calls and appointments associated with a topic;

when a new email is received by the electronic device, examine a domain name portion of a destination address of the new email to determine whether the domain name portion matches the domain name of the destination email address of the organization, and if so, update the first journal to include details of the new email; and determine whether contents of the new email match the topic, and if so, updating the second journal with details associated with the new email;

when a new telephone call is received by the electronic device, determine whether a telephone number for the new telephone call matches one of the plurality of telephone numbers of the organization, and if so, update the first journal to include details of the new telephone call;

when a new appointment request is received by the electronic device, determine whether a context of the new appointment request matches one of the plurality of appointment contexts of the organization, and if so, update the first journal to include details of the new appointment request; and determine whether contents of the new appointment request match the topic, and if so, update the second journal to include details of the new appointment request;

when an email from the electronic device is sent, determine whether contents of the sent email match the topic, and if so, updating the second journal to include details of the sent email;

when a new text message is received, determine whether contents of the new text message match the topics, and if so, update the second journal to include details of the new text message;

when modifications are made to the topic of the second journal to create a new topic, examine records in the second journal, determine whether the records meet the new topic and delete any record of the records that do not match the new topic from the second journal;

determine whether previously received emails, telephone calls and appointment requests processed by the electronic device match any one of the at least one destination email address, the plurality of telephone numbers or the plurality of appointment contexts of the organization, and if so, update the first journal to include details of the matching previously received emails, telephone calls and appointment requests; and display on a display of the electronic device contents of the first journal.

15. The non-transitory computer-readable memory as claimed in claim 14, further comprising instructions to:
   display on the display contents of the journal grouped by at least the email communications and the telephone calls when a second viewing option for the first journal has been selected.

16. The non-transitory computer-readable memory as claimed in claim 14, wherein emails and the telephone calls operate on two types of communication technologies.

17. The non-transitory computer-readable memory as claimed in claim 14, wherein additional contexts for the plurality of contexts are created using data in the database associated with calendar entries in a calendar application operating on the electronic device.

18. The non-transitory computer-readable memory as claimed in claim 14, wherein the first journal also contains text files associated with the organization.

\* \* \* \* \*